United States Patent [19]
Taylor et al.

[11] 3,934,962
[45] Jan. 27, 1976

[54] MECHANISMS FOR TRANSPORTING STRIP MATERIAL

[75] Inventors: John Thurston Taylor; Anthony James Halliday; Jonathan George Cordy Angel, all of Peacehaven; Bernard Blakemore, London, all of England

[73] Assignee: Colourvision Associates, London, England

[22] Filed: Feb. 8, 1974

[21] Appl. No.: 440,761

[30] Foreign Application Priority Data
Feb. 12, 1973 United Kingdom................ 6735/73
Feb. 12, 1973 United Kingdom................ 6737/73

[52] U.S. Cl.................................. 352/194; 226/62
[51] Int. Cl.².......................................... G03B 1/22
[58] Field of Search........... 352/191, 194, 195, 196; 226/62, 70, 71

[56] References Cited
UNITED STATES PATENTS
2,173,230   9/1939   Kellogg............................ 352/194 X
2,612,816   10/1952  Thevenaz........................ 352/194 X

*Primary Examiner*—Monroe H. Hayes
*Attorney, Agent, or Firm*—Robert F. O'Connell

[57] ABSTRACT

A film transport has an intermittent drive mechanism with a claw for engaging sprocket holes in a film. The claw is driven by the mechanism to pull the film down frame by frame. Two or more cams are used to cause the claw to carry out a four-sided motion with a fast pull-down action. One of the cams or an additional cam may be provided to render the claw operative to effect pull-down at alternately long and short dwell intervals proportioned to allow scanning of a film frame by different numbers of complete television fields.

7 Claims, 10 Drawing Figures

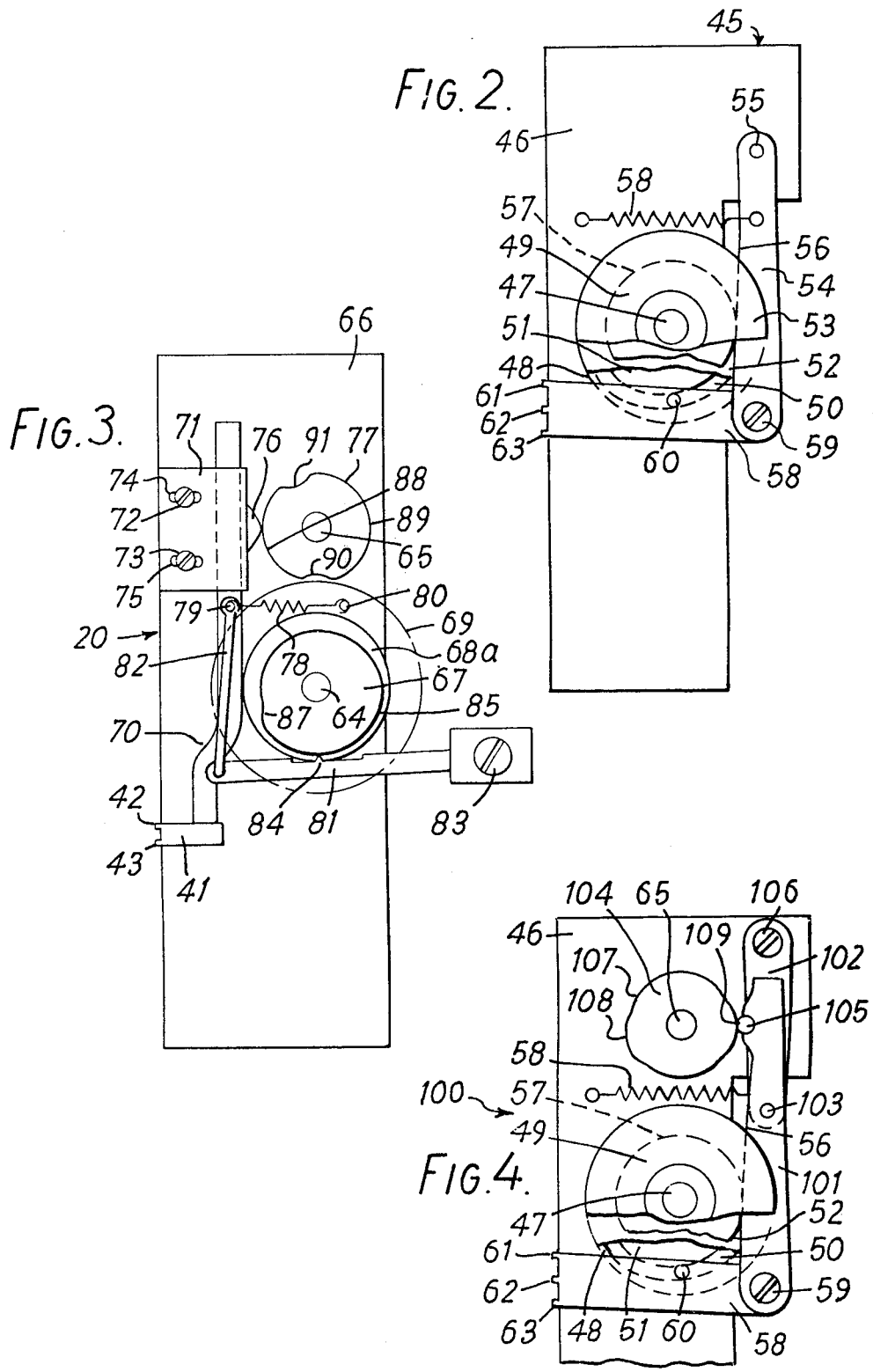

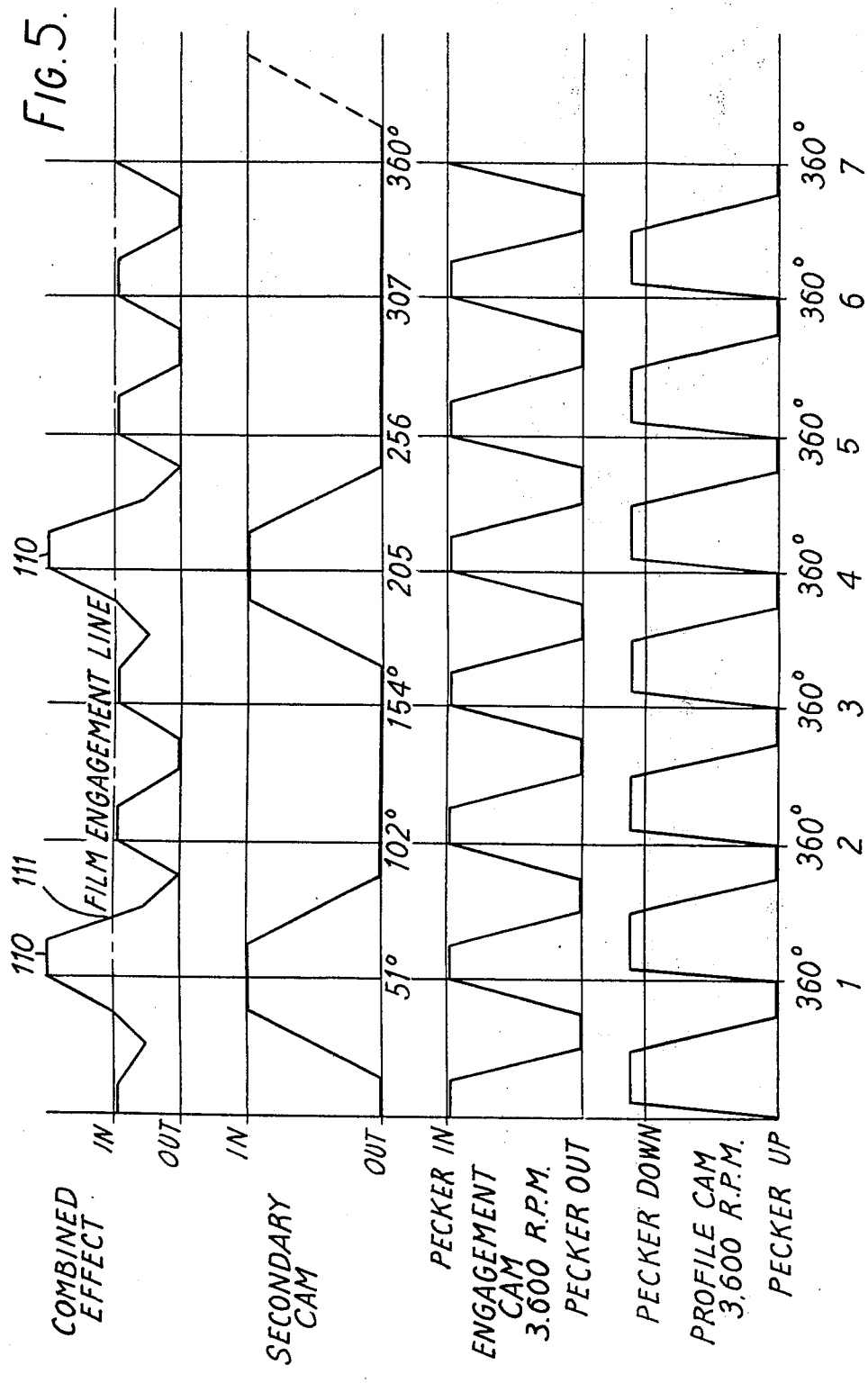

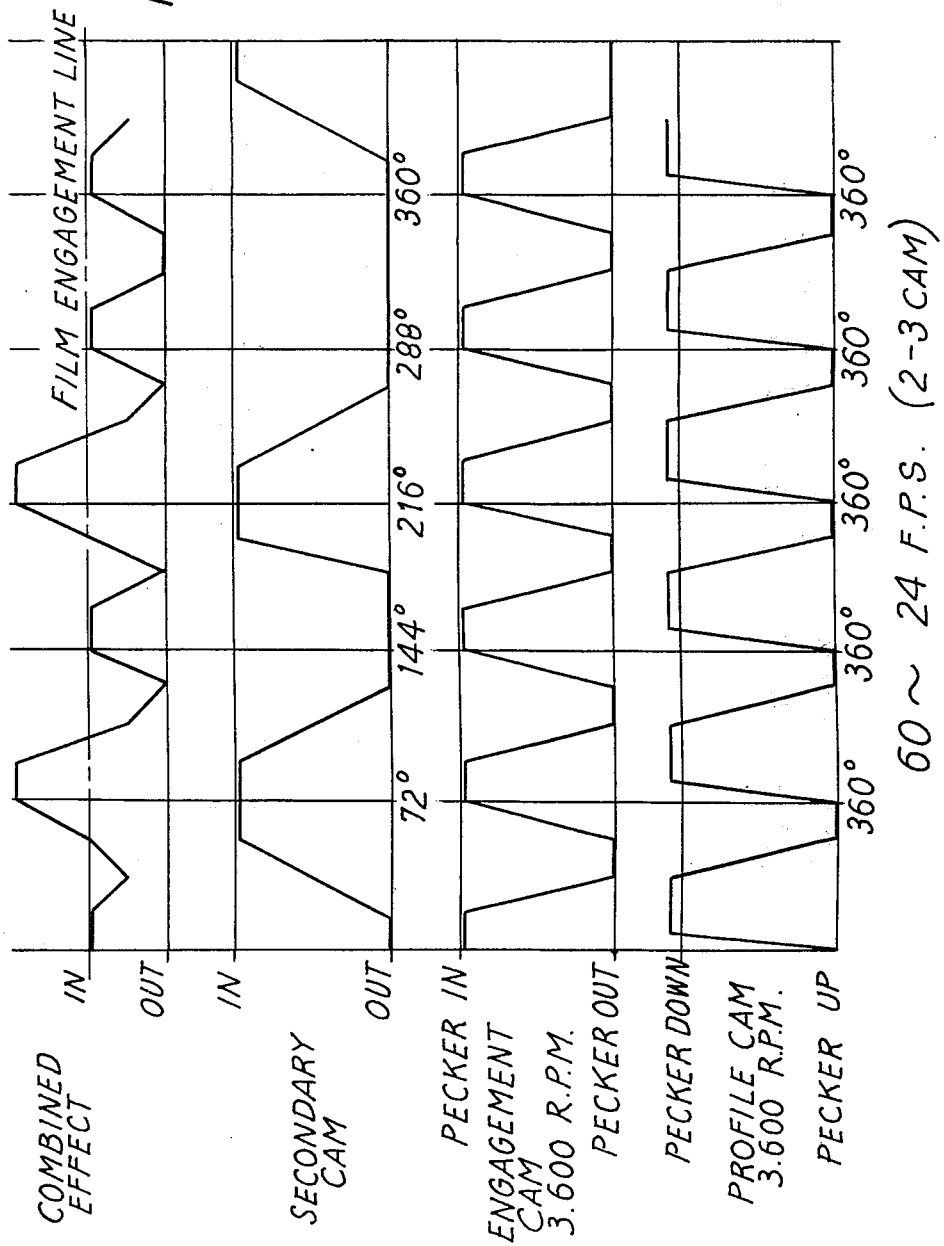

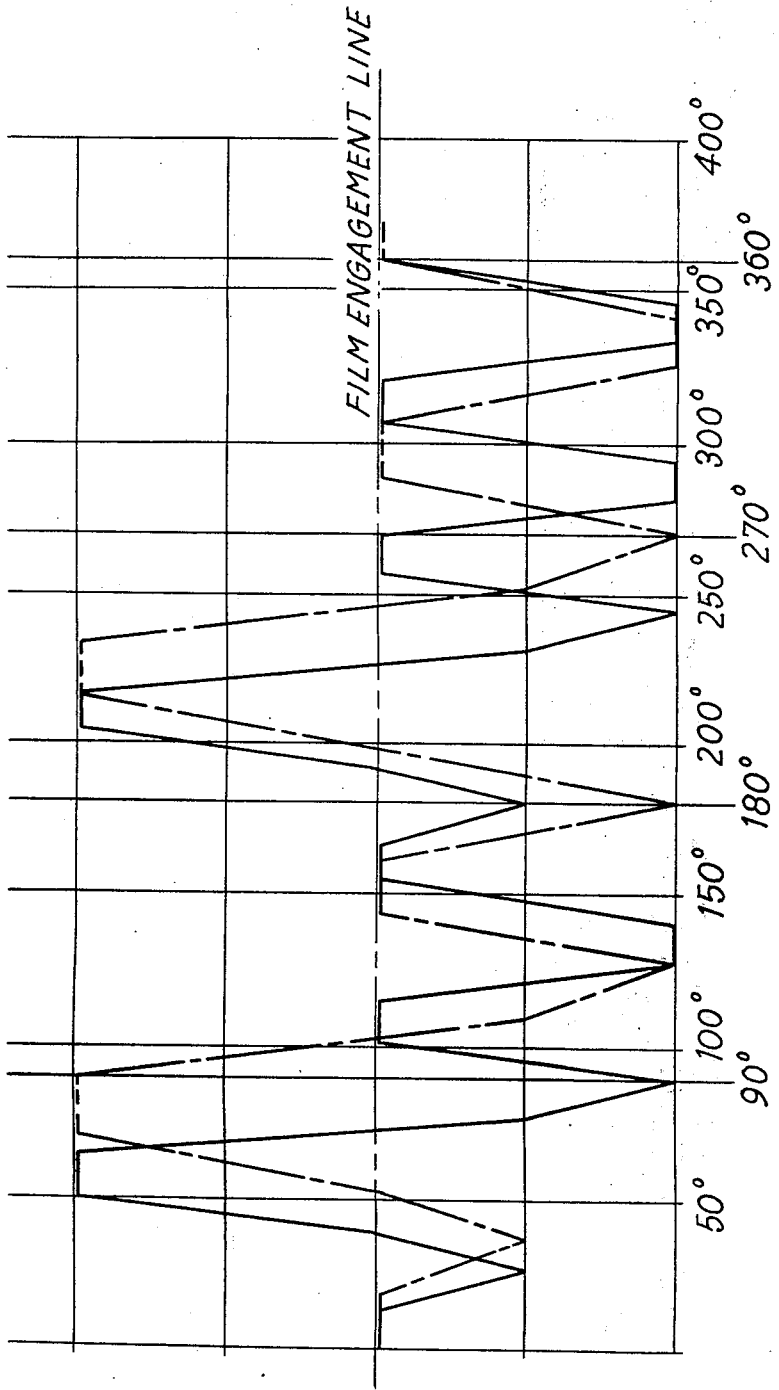

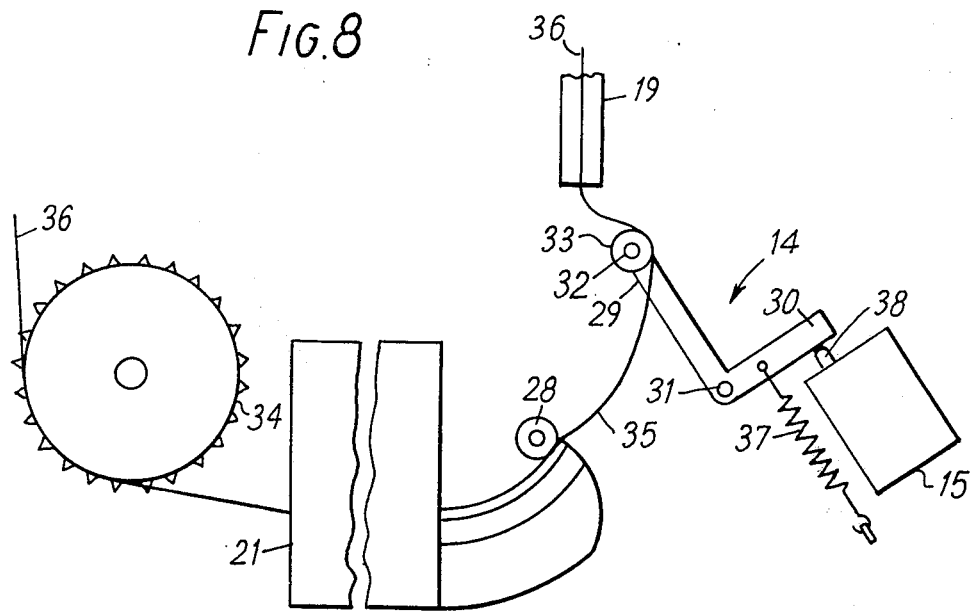
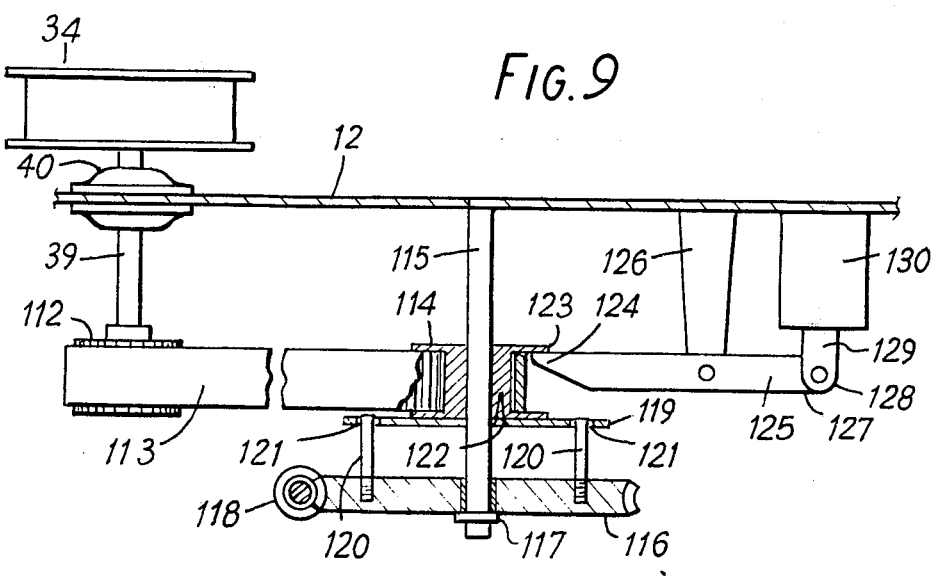

MECHANISMS FOR TRANSPORTING STRIP MATERIAL

BACKGROUND OF THE INVENTION

This invention relates to mechanisms for transporting perforated strip material, for example cine film, and particularly to an intermittent drive mechanism for transporting cine film in a flying spot television scanner apparatus.

A flying spot television scanner apparatus typically comprises a film transport mechanism including a driven take-up spool and a driven intermittent drive mechanism. Electric motors are provided for driving the take-up spool and the intermittent drive mechanism, and these motors are so controlled as to ensure that a film passes through a film gate in the transport mechanism at a rate of film frames per second which preserves the illusion of natural motion on the film and also enables each frame of the film to be scanned by two or more television scanning fields while ensuring that pull-down of the film between successive frames presented for scanning in the gate occurs only during a field blanking pulse of the television scanning. The scanning is accomplished by a point of light carrying out a television field scan on the picture area of a film frame in the gate. This point of light is produced by a cathode ray tube combined in the flying spot scanner apparatus with an optical system arranged to project an image of a raster area of the screen of the cathode ray tube on to the picture area in the gate. The cathode ray tube is coupled to television scanning and blanking circuits which in operation produce a television raster on the raster area of the tube screen.

In television in the United States, there are sixty fields per second and correspondingly sixty field blanking pulses per second. In the United Kingdom, there are fifty fields per second and fifty field blanking pulses per second.

The known flying spot television scanner apparatuses are restricted to scanning films whose intended frame rate is twenty-four frames per second. However, films intended to be shown at eighteen frames per second are produced in great numbers, and it is accordingly an object of the present invention to provide intermittent drive mechanisms which can be incorporated in a flying spot television scanner apparatus for 24 frame per second film or 18 frame per second film.

SUMMARY OF THE INVENTION

According to the present invention there is provided an intermittent drive mechanism including a first cam mounted for rotation about a first axis, and a second cam mounted for rotation about a second axis. A first lever is arranged to be moved cyclically by rotation of the first cam, and a second lever is arranged to be moved cyclically by rotation of the second cam. At least one claw is provided on one of the said levers, and there are means to guide perforated strip material such as cine film adjacent the said claw, and means so coupling the said levers together that in operation when perforated strip material is present in the said guide means and the said cams are rotating the said claw carries out a cyclical motion relative to the said axes such that the claw intermittently transports the strip material through the said guide means.

In one example of the invention the said first and second axes are colinear, there are only the said first and second levers, and the first lever has the said claw at one end thereof and is pivotally coupled to the second lever at the other end thereof, the second lever being mounted on a pivot fixed relative to the said axes. In this example the first lever may have a point thereof between the said ends thereof rigidly constrained to undergo cyclic motion radially relative to the said axes by the first cam, the second lever being resiliently constrained to undergo cyclic motion radially relative to the said axes by the second cam. The first lever may be rigidly constrained as aforesaid by the first cam being in the form of a face cam having a groove in which a cam follower pin fixed to the first lever at the said point is arranged to travel. The second cam may be a profile cam against the cam surface of which an edge of the second lever is resiliently urged by a tension spring.

In another example of the present invention the said first and second axes are parallel to one another and spaced apart, there are only the said first and second levers, and the first lever is coupled to the second lever by a link pivotally secured to each of the said levers. In this example gearing means are provided whereby when rotary drive is supplied in operation to the first cam, the second cam is driven at a lower speed such that the first cam makes an integral number of complete rotations during one rotation of the second cam. The second cam may be so shaped and the second lever so mounted that the said claw carries out a cycle of rectilinear reciprocatory motion in response to each complete revolution of the first cam during at least one part of a complete revolution of the second cam. Preferably cycles of the said reciprocatory motion occurs during two parts of a complete revolution of the second cam, and there may be unequal numbers of such cycles in the two said parts of a revolution.

In a further example of the present invention the first and second axes are parallel to one another and spaced apart, there is a third cam coaxial with the first cam, a third lever pivotally coupled to the second lever and mounted on a pivot fixed relative to the said axes, and the second lever is arranged to be moved cyclically by rotation of both the second cam and the third cam, the first and second levers being pivotally coupled together and the said claw being provided on the first lever. In this example gearing means are provided whereby when rotary drive is supplied in operation to the first cam, the second cam is driven at a lower speed such that the first cam makes an integral number of complete rotations during one rotation of the second cam. The third cam is arranged to rotate with the first cam. The first and third cam are so shaped that motion imposed upon the first lever by the second cam through the action of the second and third levers on rotation of the cams is combined with the motion imposed upon the first lever by the second cam. Preferably the second cam is so shaped that the motion imposed on the first lever by the frequency with which the third cam brings the said claw into a position to effect transport of strip material is less than the rate of rotation of the first and third cams.

According to a preferred feature of the present invention there is also provided a film transport apparatus including a film gate, an intermittent feed mechanism arranged to cooperate with the gate, a take-up sprocket, a sound track sensing device mounted between the sprocket and the gate, means for sensing shortening of the length of film between the gate and the sound track sensing device during operation, and a drive transmission for transmitting rotary drive to the take-up sprocket. The drive transmission includes a clutch having a driven member and a driving member which are positively engageable with one another in one or more positions relative to one another, and the said sensing means being adapted to disengage the clutch in response to shortening of the length between the gate and the sound track sensing device to less than a predetermined length. The said sensing means may include a roller mounted on a pivoted lever and arranged to be moved by film between the said gate and the sound track sensing device in operation when the film shortens to the said predetermined length. The said clutch may be arranged to be disengaged by a lever operated by a solenoid which is energised when a microswitch is actuated in operation by the said sensing means.

Preferred embodiments of the present invention will now be described in more detail with reference to the accompanying drawings.

BRIEF DESCRIPTION OF THE DRAWINGS

In the drawings:

FIG. 2 is a side view, partly broken away, of an embodiment of the invention, FIG. 3 is a side view of the said mechanism of FIG. 1 on a larger scale, FIG. 4 is a side view, partly broken away, of another embodiment of the invention, FIGS. 5, 6 and 7 are graphs illustrating features of the operation of the embodiment of FIG. 4, FIG. 8 is a plan view of a sensing means of the transport apparatus of FIG. 1, FIG. 9 is a side view, partly in section of clutch means in the transport apparatus of FIG. 1.

DETAILED DESCRIPTION OF THE PREFERRED EMBODIMENTS

Figure 10:
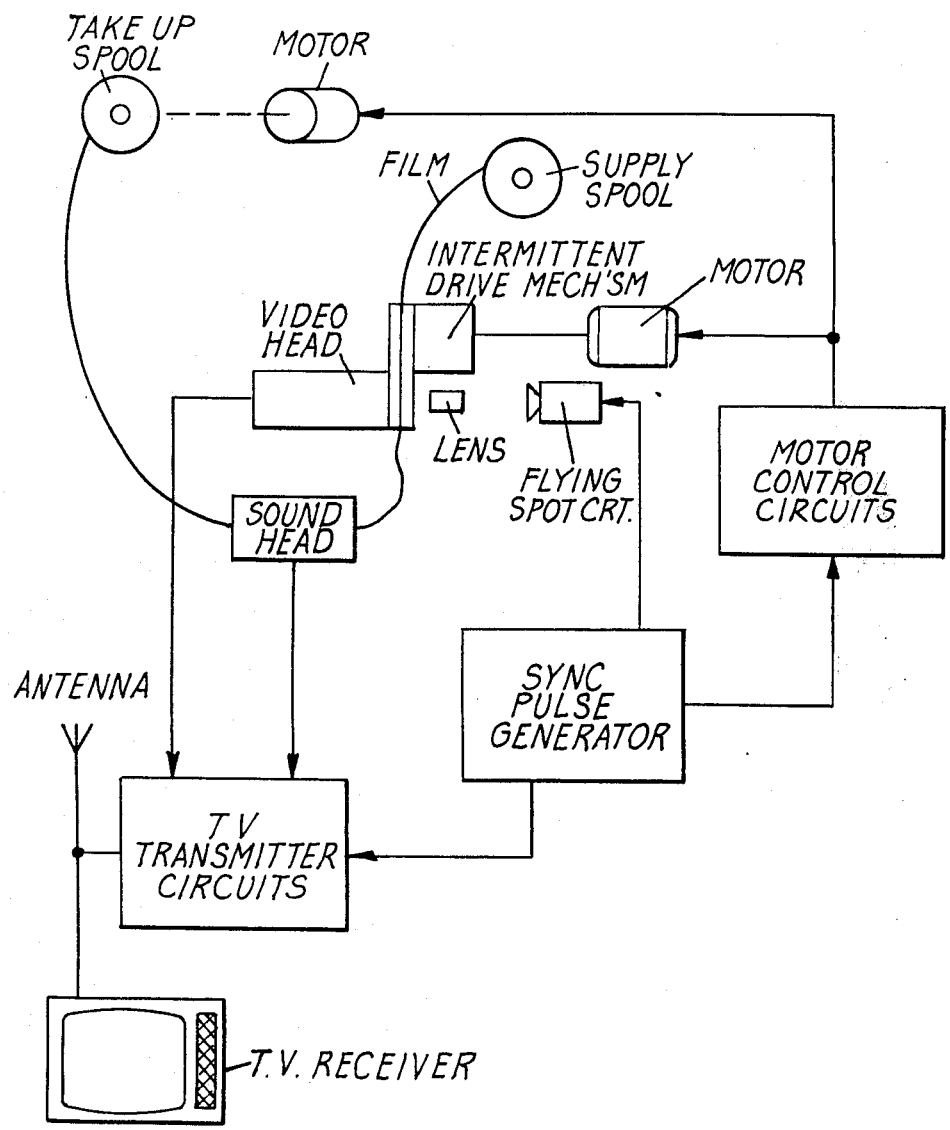
FIG. 10 is a block diagram of the flying spot television scanner apparatus incorporating the invention of FIGS. 1 to 9.

A novel flying spot television scanner apparatus embodying the present invention will now be described with reference to FIG. 10 of the accompanying drawings. In FIG. 10 there is shown a television transmitter apparatus coupled by a transmission line such as a coaxial cable to an antenna and a television receiver. Where the transmitter apparatus is intended to broadcast a programme via the antenna, the coupled receiver may be a transmission monitoring receiver. Alternatively, the apparatus of FIG. 10 may be intended primarily as a cable television system, the transmission antenna being disconnected or replaced by a receiving antenna for the individual receiver and the receiving antenna may be disconnected when the receiver is being supplied by the transmitter apparatus, or may remain connected if there is no risk of interference from signals in the channel of frequencies transmitted by the transmitter apparatus.

The transmitter apparatus includes a flying spot receiver with a film transport mechanism including a driven take-up spool and a driven intermittent drive mechanism of the invention. A first d.c. electric motor controlled by motor control circuits is coupled through, for example, conventional reduction gearing to drive the take-up spool, and a second d.c. electric motor controlled by the motor control circuits is coupled through, for example, conventional reduction gearing to drive the intermittent drive mechanism of the invention. The film transport mechanism also includes a film gate through which film from a supply spool is drawn by the intermittent drive mechanism of the invention to pass before a video head and through a sound head before winding on to the take-up spool. Further novel features of the apparatus of FIG. 10 are shown in and described with reference to FIGS. 1 to 9 of the drawings. Conventional mechanical details of the film transport which will be obvious to those skilled in the art will, for clarity, not be described herein. The motor control circuits are preferably as described and claimed in the co-pending application entitled "Control Apparatus for Electric Motors" by Geoffrey Sword, John L. Lawrence, Stephen R. Raggett and Bernard Blakemore and filed on the same day as the present application.

The scanner includes a flying spot cathode ray tube controlled by a synchronizing pulse generator. Such arrangements are described in The Focal Encyclopedia of Film & Television Techniques published in 1969 by The Focal Press, London and New York, at pages 817 to 845. Synchronziing pulse generators are described in the aforesaid Focal Encyclopedia at page 811.

In operation a television field raster is produced on the screen of the cathode ray tube, and the light from the scanning spot constituting this raster is focussed by a lens or lens system to form an image of the raster on a picture area of a frame of the film in the film gate. The video head may be a conventional monochrome television video head incorporating a single photomultiplier and suitable optical elements for focussing light from the illuminated picture on to the sensitive area of the photomultiplier, thereby producing in operation a video signal which is supplied by the video head to the composite video signal forming portion of television transmitter circuits, the output of the synchronizing pulse generator likewise being supplied thereto in known manner for the production in the transmitter circuits of a composite video signal. If the transmitter apparatus is intended to transmit colour television signals, and the colour system is the NTSC system, the transmitter circuits and synchronizing pulse generator may be as described in Principles of Colour Television by The Hazeltine Laboratories Staff, published by 1956 by John Wiley & Sons, Inc., Library of Congress Catalogue Card Number 56- 8693. Where the colour system is the PAL system, the transmitter circuits and synchronizing pulse generator may be as described in PAL Color Television by G. Boris Townsend, published by the Syndics of the Cambridge University Press, London and New York, in 1970, Library of Congress Catalogue Card Number 76-96102. Further detailed circuitry can be found in Colour Television, Volumes 1 and 2, by P. S. Carnt and G. B. Townsend, published in 1961 and 1969 respectively by Iliffe Books, Ltd., London, and Principles of PAL Colour Television and Related Systems, by H. V. Sims, published in 1969 by Iliffe Books, Butterworth & Co. (Publishers) Ltd., London and Toronto. The latter contains an Appendix I at pages 139 to 143 which describes in outline a flying spot colour television transparency scanner for film slides.

The motor control circuits generate a control output signal for controlling the two electric motors in response to the field blanking pulses generated by the synchronizing pulse generator so that the film is drawn through the gate at a rate commensurate with the field frequency and is moved only during field blanking intervals.

For television in the United Kingdom, the standard field frequency is fifty Hertz. Standard film transport rates are eighteen frames per second and twenty-four frames per second. For television purposes in the United Kingdom, these rates can be allied to 16⅔ frames per second and 25 frames per second without loss of illusion of natural movement. At the former rate each frame can be scanned three times by a field raster, and at the latter rate each frame can be scanned twice by a field raster, since 16⅔ multiplied by 3/50 is 1, and 25 multiplied by 2/50 is 1.

In the United States, the standard film transport rates are also eighteen frames per second and twenty-four frames per second. However, the United States standard field frequency is sixty Hertz. The standard film rate of 18 frames per second can be altered to 17 1/7 frames per second without loss of the illusion of natural movement. An average rate of 17 1/7 frames per second can be achieved by holding alternate frames in the film gate for 3/60 seconds and 4/60 seconds, thus providing scanning times for alternate frames corresponding to 3 fields and 4 fields. An average rate of 34 frames per second can be achieved by holding alternate frames in the film gate for 2/60 seconds and 3/60 seconds, thus providing scanning times for alternate frames corresponding to 2 fields and 3 fields.

Figure 1:
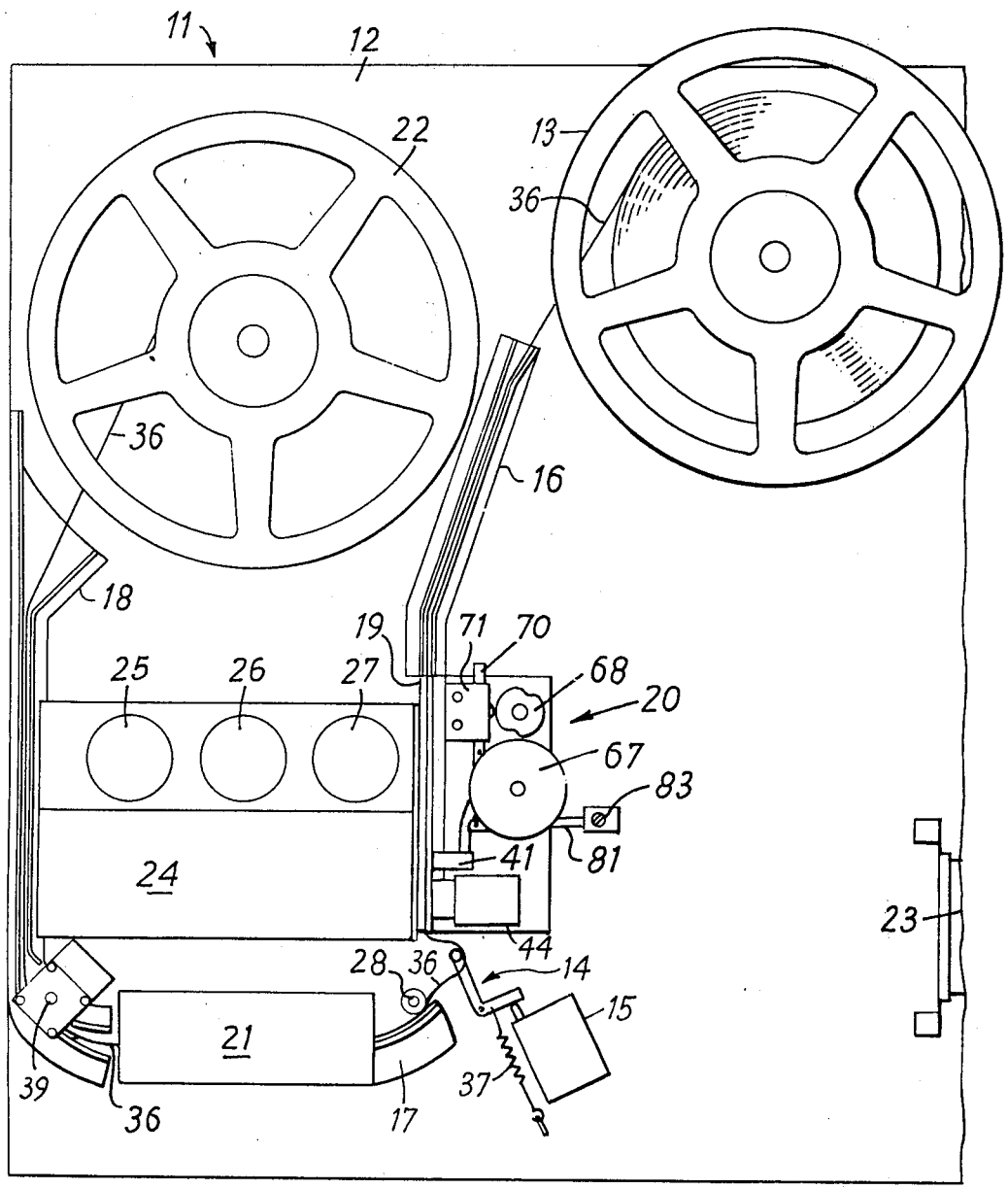
FIG. 1 is a simplified plan view of a film transport apparatus including a mechanism according to the present invention.

In FIG. 1 of the drawings there is shown a film transport apparatus 11 of a flying spot scanner for use with the colour film. The apparatus 11 includes a deck 12 on which are mounted the supply spool 13, a film loop sensor lever 14, a microswitch 15, film guides 16, 17 and 18, an optical gate 19, an intermittent feed mechanism 20, a sound track sensing head 21, a take-up spool 22, a flying spot cathode ray tube 23, a dichroic unit 24, and three photomultipliers, 25, 26 and 27.

In operation, the supply spool 13 loaded with a film is mounted on the deck 12, and the free end of the film therein initially manually extracted and passed through the guide 16, the gate 19, between the guide 17 and a roller 28, through the sound track sensing head 21, through the guide 18, and into the spool 22. The spool 22 is rotated while the extractor 14 is operating and is provided with projections on the opposed inner faces of its spokes and outer rims so that the film is automatically wound on to the central core of the spool 22.

The path of a film from the supply spool to the take-up spool 22 is indicated by a line 36.

The L-shaped loop sensor lever 14 is mounted to pivot at the junction of its two limbs 29 and 30 on a pin 31 the axis of which is perpendicular to the plane of the limbs 29 and 30. At the end of the limb 29 remote from the pin 31 a further pin 32 is secured so as to be parallel to the pin 31 and has journalled thereon a roller 33, as best shown in FIG. 8.

The path 36 of the film passes through the gate 19 and through the sound head 21, is engaged by the take-up sprocket 34 and passes thence to the take-up spool 22.

The intermittent drive mechanism 20 has a member 41 which carries out a four-sided cyclic movement, enters two sprocket holes in the film, draws the film one frame through the gate 19, withdraws from the sprocket holes, and returns to the position immediately preceding its entry into the next pass of sprocket hole in the film.

The take-up sprocket 34 is, except as will be described hereinafter, rotated continuously in operation. The intermittent movement of the film produced by the member 41 is smoothed before the film enters the sound head 21, through which it is continuously drawn by the sprocket 34, by the presence of a loop 35 between the gate 19 and the sound head 21. So long as the length of film between the sound head 21 and the gate 19 is sufficient for the continued rotation of the sprocket 34 during the time that a frame is stationary in the gate 19, the roller 33 remains in the position shown in FIG. 8. The roller 33 is held in the said position by a tension spring 37 acting on limb 30 so as to tend to rotate the lever 14 clockwise as viewed in FIG. 8, and an actuating rod 38 of the microswitch 15 fixed to the deck 12, the rod 38 being in its depressed position and serving as a stop for the limb 30. When the rod 38 is in its depressed position the contacts of the microswitch 15 are thereby held open.

If the member 41 fails to move the film through the gate 19 during one of its cycles, the continuing rotation of the sprocket 34 results in the length of film forming the loop 35 being shortened to such an extent that it pulls against the roller 33 and thereby moves the lever 14 anticlockwise sufficiently for the actuating rod 38 of the microswitch 15 to move and allow the contacts of the microswitch to close.

Closure of the contacts of the microswitch results in the sprocket 34 ceasing to rotate for a predetermined time, as will be explained hereinafter with reference to FIG. 9.

The sound track sensing head 21 may include both optical and magnetic sound track sensing devices.

The member 41 of the intermittent feed mechanism 20 is a claw head 41 provided with two claws 42 and 43 arranged to enter two consecutive sprocket holes at one margin of the film in the gate 19, the gate being provided with a guiding slot (not shown) which holds the claws 42 and 43 in a plane containing the sprocket holes to be engaged. The mechanism 20 shown in FIG. 1 is intended to be used when a flying spot cathode ray tube produces sixty scanning fields per second, as in television in the United States, and the film in the apparatus 11 is intended to be shown at 18 frames per second or 24 frames per second. In the apparatus 11, such film is, as mentioned hereinbefore, actually passed through the gate 19 at average rates which differ slightly from the nominal 18 or 24.

An image of the flying spot produced by the cathode ray tube 23 is focussed on each frame of the film by a lens system 44, the magnification of which is such that the imge of a complete field of the scan is in register with the frame in the gate 19.

The dichroic unit 24 contains dichroic elements arranged to separate the red, blue and a green components of light transmitted by the film when scanned, and further optical elements arranged to focus the red components on to the photocathode of the photomultiplier 25, the blue components on to the photomultiplier 26, and the green components on to the photomultiplier 27. The signals thus generated by the photomultipliers 25, 26 and 27 are supplied to colour television transmitter circuits as the three tristimulus signals. The operations of the line and field scanning circuits (not shown) of the cathode ray tube 23 are synchronised respectively with the line and field synch pulses generated in the synchronizing pulse generator.

The intermittent feed mechanism 20 is such that in operation when a film intended to be shown at eighteen frames per second is in the apparatus 11, successive frames of the film are scanned for three and four fields alternately, i.e. the mechanism 20 holds one frame stationary for the duration of three fields, the next frame for the duration of four fields, and the following frame for three fields, and so on. Since each field precedes the next by one sixtieth of a second, the average rate of travel of the film through the gate 19 is two frames per seven sixtieths of a second, i.e. 17 1/7 frames per second, which is substantially 18 frames per second.

A minor modification of the mechanism 20 enables film intended to be shown at 24 frames per second to be passed through the apparatus 11. In this case, successive frames are scanned by two and three fields alternately, i.e. one frame is scanned by two fields, the next frame by three fields, the following by two fields, and so on. Thus two frames are scanned by five fields, so that the rate of travel of the film is two frames per twelfth of a second, i.e. 24 frames per second.

A field scanning rate of sixty fields per second is standard in the United States of America. However, in the United Kingdom, the standard rate is fifty fields per second, and another form of intermittent feed mechanism 45 is used in the apparatus of FIG. 1 and is shown on a larger scale in FIG. 2.

The mechanism 45 has a support plate 46 through which a drive shaft 47 extends perpendicularly. Coaxially secured to the shaft 47 are two cams 48 and 49, the cam 48 being a face cam and having a groove 50 in one side face 51 thereof, and the other cam 49 being a profile cam provided with radially extending peripheral flanges 52 and 53.

Slidably located between the flanges 52 and 53 is a first lever 54 pivoted on a pin 55 fixed to and extending perpendicularly from the plate 46. The lever 54 is flat and has one edge 56 held resiliently against the cam surface 57 of the cam 49 by a tension spring 58 having one end fixed to the lever 54 at a point between the pivot pin 55 and the point of contact between the edge 56 and the surface 57, and the other end fixed to the plate 46. The surface 57 is so shaped as to cause the lever 54 to undergo one cycle of angular oscillation about the pin 55 for each revolution of the cam 49. The flanges 52 and 53 prevent the lever 54 moving in other directions.

A second lever 58 is pivotted to the first lever 54 at a bolt 59 located at the end of the lever 54 remote from the pin 55. A follower pin 60 is fixed in the lever 58 so as to extend perpendicularly therefrom, the lever 58 being flat and having its faces parallel to those of the first lever 54, into the groove 50. The pin 60 is a sliding fit in the groove 50. When the cam 48 makes one revolution, the pin 60 is thereby caused to undergo one cycle of oscillation radially relative to the axis of the shaft 47.

The end of the shaft 58 remote from the pivot bolt 59 is provided with three claws 61, 62 and 63 arranged to engage three successive sprocket holes at one side of a film.

The two cams 48 and 49 rotate as one unit together with the shaft 47 in operation. Consequently the claws 61, 62 and 63 carry out a four sided motion, in one side of which the claws 61, 62 and 63 are engaged in respective successive sprocket holes in a film to be fed through the gate 19 and draw the film a distance of one frame through the gate. If the film is intended to be shown at 24 frames per second, it is arranged that the shaft 47 rotates at 25 revolutions per second, i.e. 1,500 revolutions per minute, so that the film is actually moved at 25 frames per second, each frame being scanned twice. For a film intended to be shown at eighteen frames per second, the shaft 47 is rotated at one thousand revolutions per minute so that the film is drawn through the gate at 16⅔ frames per second. Each frame is then scanned three times.

The pull-down action of the lever 58 is synchronised with the field flyback time and, by suitable geometry of the groove 50, is accomplished in three milliseconds. This is acceptable with a field flyback time of 1.2 milliseconds or longer.

The claws 61, 62 and 63 are shaped to be a good sliding fit in the sprocket holes of the film so that shock by impact of the claws 61, 62 and 63 on edges of respective sprocket holes is substantially avoided.

FIG. 3 shows the mechanism 20 of FIG. 1 on a larger scale. The mechanism 20 includes two shafts 64 and 65 extending perpendicularly through a support plate 66. The shafts 64 and 65 are coupled together by conventional gearing which in operation transmits rotary drive from the shaft 64 to the shaft 65 with a speed reduction. Two profile cams 67 and 68 are fixed coaxially on ends of the shafts 64 and 65 respectively. The cam 67 is provided with a radially extending flange 69 at each of its end faces. The claw head 41 is secured to one end of a first lever 70 which is located in a channel in a slide-block 71 relative to which the lever 70 can move longitudinally only. The slide-block 71 is secured to the plate 66 by two bolts 72 and 73 which extend through two slots 74 and 75 in the block 71. The slots 74 and 75 extend perpendicularly to the length of the lever 70 in the block 71 and allow the block 71 to move reciprocatively in a direction perpendicular to the length of the lever 70. The block 71 is equipped with a cam follower 76 which is held against the cam surface 77 of the cam 68 by a tension spring 78 having one end fixed to the lever 70 at a point 79 between the shafts 64 and 65, and the other end fixed to the support plate 66 at another point 80 between the shafts 64 and 65. The lever 70 bears against the periphery of a circular disc 68a mounted coaxially on the shaft 64 and serving as a pivot for the lever 70.

The first lever 70 is connected to a second lever 81 by a stiff spring wire 82 fixed to the lever 70 at the point 79 and to one end of the lever 81. The other end of the lever 81 is pivoted on a bolt 83 secured to the frame 12 of the film transport apparatus 11. The lever 81 is flat and is slidably located between the flanges 69 so that a cam follower 84 provided at one edge of the lever 81 bears against the cam surface 85 of the cam 67.

In operation, the cam 67 rotates anit-clockwise as viewed in FIG. 3. A portion 86 of the surface 85 having an increasing radius provides a fast pull-down operation by the claw head 41. The return motion by the claw head is substantially faster than the pull-down motion and is effected by a short portion 87 of the surface 85 where the radius decreases rapidly.

The cam 68 has two portions 88 and 89 of its cam surfaces 77 at a maximum uniform radius and rotates clockwise as viewed in FIG. 3. The portions 88 and 89 are of unequal angular extent and are separated from one another by concavities 90 and 91.

In operation when a film to be shown at eighteen frames per second is passing through the apparatus 11, a gear ratio of seven to one is provided between the shafts 64 and 65 and the shaft 64 is rotated at 3600 revolutions per minute, so that the shaft 65 rotates at 8 4/7 revolutions per second. The claws 42 and 43 engage the film when the cam follower 76 is passing over the concavities 90 and 91. The portions 88 and 89 of the surface 77 occupy substantially 120° and 160° respectively, and the concavities each occupy substantially 40°, their centre points being 154° apart relative to the axis of the shaft 65. Each revolution of the cam 68 corresponds to the passage of two frames of the film through the gate 19, so that the average rate of passage of the film is 17 1/7 frames per second. The follower 76 is in contact with the surface 77 between the midpoints of the concavities 90 and 91 over the portion 88 for substantially three sixtieths of a second, so that the frame held in the gate 19 during this time is scanned by three fields, and the follower 76 is in contact with the surface 77 between the said points over the portion 89 for substantially four sixtieths of a second, so that during this time the next frame is scanned by four fields. The cam surface 85 of the cam 67 is such that the pull-down action of the head 41 occupies 3 milliseconds or less at times corresponding substantially to the times of contact of the follower 76 with the respective midpoints of the concavities 90 and 91.

When the film in the apparatus 11 is intended to be shown at 24 frames per second, a gear ratio of five to one is provided between the shafts 64 and 65, and the shaft 64 is rotated at 3600 revolutions per minute, so that the shaft 65 rotates at 12 revolutions per second. The cam 68 is therefore again provided with two concavities separating two portions of uniform radius, so that the average rate of passage of the film through the intermittent feed mechanism 20 is 24 frames per second. Since each revolution of the shaft 65 takes five sixtieths of a second, there are five scanning fields for each pair of frames of the film. Therefore one frame is scanned three times and the other is scanned twice. This is achieved by arranging that the midpoints of the two concavities in the cam surface of the cam are 144° apart so that the intervals between successive pull-downs alternate between two sixtieths of a second and three sixtieths of a second.

Although the angular separation of the two midpoints of the concavities in the cam surface for a 24 frames per second film is 144° whereas that for an 18 frames per second film is 154°, this difference is sufficiently small for it to be possible to use the same cam for both types of film and merely alter the gear ratio between the shafts 64 and 65 to suit the intended rate of the film. The common cam used is of course designed to minimise the difference from the ideal shape for the particular frame rate, and therefore the angular separation of the midpoints of the two concavities of the common cam is chosen to be substantially 150°.

A problem arises from the relatively small angular extent of the concavities 91 and 92 of the cam 68, namely noise arising from the passage of the follower 76 over rapidly changing curvature at the junctions between the concavities and the portions 88 and 89.

FIG. 4 shows another intermittent feed mechanism 100 which can replace the mechanism 20 of FIGS. 1 and 3 and is such as to produce significantly less noise.

The mechanism 100 has a support plate 46 corresponding to that of the mechanism shown in FIG. 2. Other elements of the mechanism 100 corresponding generally to those of FIG. 2 have been given corresponding reference numerals. The mechanism 100 differs from that of FIG. 2 in having second and third levers 101 and 102 pivotally connected by a pin 103, and a third cam 104 secured to the end of a shaft 65 corresponding to the shaft 65 of FIG. 3. The second lever 101 bears not only on the cam surface 57 but also, through a cam follower 105, on the third cam 104. The third lever 102 is pivoted on a bolt 106 secured in the plate 46. The tension spring 58 is secured at one end to the plate 46 and at the other end to the pin 103.

In operation the shaft 47 is rotated at 3600 revolutions per minute and the claws 61, 62 and 63 consequently carry out, relative to the axis of the shaft 47, sixty cycles of four sided motion per second. However, it is arranged that the claws 61 to 63 do not engage the film in the gate 19 unless the follower 105 is riding on a portion of the cam surface 107 of the third cam 104 having a maximum radius. Two such maximum radius portions 108 and 109 are provided on the cam 104 and having respective midpoints angularly separated by substantially 150° relative to the axis of the shaft 65. The motions imposed upon the claws 61 to 63 by the cams 104 and 49 are algebraically additive and result in the claws 61 to 63 engaging the film whenever the follower 105 is in contact with the midpoints of the portions 108 and 109.

Reduction gearing is provided between the shafts 47 and 65 as for the mechanism of FIG. 3 and give, selectively, a ratio of five to one or seven to one between the shafts. When a film intended to be shown at 18 frames per second is passed through the apparatus, the ratio seven to one is chosen, so that the shaft 65 rotates at 8 4/7 revolutions per second, and consequently the mechanism 100 feeds the film through at an average rate of 17 1/7 frames per second. Similarly, the ratio five to one is chosen for a 24 frames per second film, and the shaft 65 rotates at 12 revolutions per second.

FIG. 5 shows graphically the separate and combined motions imposed upon the claws 61 to 63 by the cams 48, 49 and 104 when the angle between the midpoints of the portions 108 and 109 is 154° and the gear ratio is seven to one. In FIG. 5, the cam 48 is referred to as the pecker profile cam, the cam 49 is referred to as the pecker engagement cam, and the cam 104 is referred to as the secondary cam. It will be seen that the separate motions of the pecker engagement cam 49 and the secondary cam 104 are individually not sufficient to bring the claws 61 to 63 into the film, the horizontal level IN being substantially representative of the surface of the film nearest the claws. The combined motions of these two cams, indicated by COMBINED EFFECT, gives entry of sprocket holes of the film by the claws 61 to 63 twice during one revolution of the cam 104, each occurrence corresponding to the concurrence of a peak in the motion given by the cam 49 towards the film with a peak in the motion given by the cam 104 towards the film. Since the cams 48 and 49 are so arranged relative to one another that each change from UP to DOWN in the position of the claws 61 to 63 occurs during a respective peak in the motion given by the cam 49 towards the film, a pull-down action occurs in each period 110 during which the claws 61 to 63 are located to the fullest extent in sprocket holes in the film. For the remainder of the time that the claws are located to any extent in the film, the cam 48 imposes no motion on the claws 61 to 63, the DOWN to UP change occuring after the claws 61 to 63 have disengaged from the film as indicated by crossing of the COMBINED EFFECT graph with the FILM ENGAGEMENT LINE at a point 111. It will be noted that each cycle of the motion of the pecker profile cam 48 corresponds to a field in the scanning of the film, the UP to DOWN change coinciding with the field fly-back time. Thus the frame held stationary in the interval between the numerals 1 and 4 in FIG. 5 is stationary for three sixtieths of a second and is scanned by three fields, and the next frame is held stationary for four sixtieths of a second and is scanned by four fields. The average rate of feed of the film is therefore 17 1/7 frames per second.

FIG. 6 shows graphically the separate and combined motions impsed on the claws 61 to 63 by the cams 48, 49 and 104 when the angle between the midpoints of the portions 108 and 109 is 144° and the gear ratio is five to one. In this case the pull down action occurs at alternate intervals of two and three sixtieths of a second and the average rate of feed of the film is 24 frames per second.

FIG. 7 shows the combined motions imposed by the cams 49 and 104 over one revolution of the cam 104 for the two cases of FIGS. 5 and 6. It will be seen that the there is substantial overlapping of the two regions in which the claws 61 to 63 engage the film when the portions 108 and 109 are separated by 144° with the corresponding regions when the said portions are separated by 154°. A common cam 104 can therefore be used to replace these two different cams 104.

In the mechanism 100 of FIG. 4, provision is made for small adjustments in the position of the pull-down motion of the claws 61 to 63 relative to the plate 46. These adjustments can be effected by rotation of the bolt 106 the screw-thread axis of which is eccentric to the axis of the pivot the bolt 106 provides for the lever 102.

To enhance smooth running of the mechanism 100, the cam follower 105 is preferably a short cylinder of metal held in a bearing mounted on the lever 101 and formed of a plastics material such as polytetrafluoroethylene.

Although the film transport drive mechanisms described hereinbefore are described as being incorporated in a flying spot scanner, such mechanisms embodying the invention can also be incorporated in cine projectors and cine cameras.

FIG. 9 shows the sprocket 34 coaxially mounted on the shaft 39 which extends through a bearing 40 in the deck 12 to a first toothed pulley 112 so that rotary drive can be transmitted directly from the pulley 112 to the sprocket 34. The pulley 112 is engaged with an internally toothed drive belt 113 which is also engaged with a second toothed pulley 114 journalled on a shaft 115 fixed to the deck 12 and extending parallel to the shaft 39. A worm-wheel 116 is also journalled on the shaft 115 and prevented from moving off the free end of the shaft 115 by a circlip 117. A worm drive 118 engages the worm-wheel 116 to transmit rotary drive thereto from the take-up spool motor. When the film transport apparatus is operating, the said motor runs continuously so that the worm-wheel 116 rotates continuously. Rotary drive is transmitted from the worm-wheel 116 to a disc 119 and thus to the second pulley 114 through two substantially rigid axially extending pins 120 screw-threadedly engaged with the wheel 116 and received in respective diametrically opposite holes 121 in the disc 119, the disc being secured to the pulley 114 by three screws one, 122, of which is shown.

The pulley 114 is flanged and has the inner surface of its flange 123 remote from the disc 119 in a position to be engaged by the tip 124 of a lever 125 pivotally mounted on a fixed support 126 extending from the deck 12.

The end 127 of the lever 125 remote from the tip 124 is pivotally secured to the outer end 128 of a solenoid piston 129 extending from a solenoid 130 mounted on the deck 12. In FIG. 9 the piston 129 and the lever 125 are shown in the position which they have when the solenoid 130 is not energised. When the solenoid 130 is energised, the piston 129 extends further from the solenoid 130, thereby turning the lever 125 on its pivot on the support 126, and causing the tip 124 of the lever to move the pulley 114 and hence the disc 119 away from the worm-wheel 116 sufficiently for the pins 120 to disengage from the holes 121. Thus when the solenoid 130 is energised, the worm-wheel 116 can no longer transmit rotary drive to the pulley 114, and the sprocket 34 therefore ceases to to rotate. The solenoid 130 is energized when the contacts of the microswitch 15 close.

Since the take-up spool motor continues to drive the worm-wheel 116, the pins 120 move away from the positions of the holes 121 shown in FIG. 9 when the solenoid 130 is energised. Consequently, the pulley 114 and hence the sprocket 34 will remain stationary until the pins 120 re-enter holes in the disc 119. The disc 119 is provided with 16 holes 121 arranged as eight pairs of diametrically opposite holes on the same radius as the holes shown. The pulleys 114 and 112 have different numbers of teeth since they form part of a step down gearing from the said motor to the sprocket 34. The choice of eight pairs of holes 121 in the disc 119 is made since the time taken by the worm-wheel 116 to make one eighth of a rotation relative to the stationary disc 119 is the time taken for sufficient film to be fed through the gate 19 to restore the loop 35 when the sprocket 34 is stationary. If in this time some film is fed through the gate 19 but not sufficient to restore the loop 35 the microswitch 15 is actuated again as soon as the sprocket 34 has taken up the slack in the film. If no film is fed through the gate 19 while the sprocket 34 is stationary, the microswitch 15 remains actuated and the sprocket 34 remains stationary. Thus damage to the film is minimised.

We claim:
1. An intermittent drive mechanism comprising:
face cam means mounted for rotation about an axis;
profile cam means mounted for rotation about the said axis;
said face cam means having a side face defining a cam groove;
first lever means arranged to be moved cyclically by rotation of said face cam means,
claw means provided on said first lever means;
cam groove follower means provided on said first lever means and extending parallel to said axle to engage said cam groove whereby to be positively guided to effect the cyclical movement of the first lever means on rotation of said face cam means;
second lever means arranged to be moved cyclically by rotation of said profile cam means and pivotally coupled to said first lever means whereby to impose the cyclical movement of said second lever means on said first lever means; and strip guiding means arranged adjacent said claw means whereby said cyclical movements of said first and second lever means imposed upon said claw means drives said claw means in cyclical motion such that said claw means is engageable with and disengageable from perforated strip material in said guiding means under the action of said profile cam means, and intermittently transports said material in said guiding means under the action of said face cam means.

2. An intermittent drive mechanism as claimed in claim 1 wherein a further profile cam means is mounted for rotation about a further axis parallel to and spaced from the first said axis and said second lever means is arranged to be moved cyclically by rotation of said further profile cam means, said further profile cam means having a profile comprising two arcs of equal radius separating two regions of rapidly changing radius, and profile follower means are provided for said second lever means to follow the profile of said further profile cam means whereby said second lever means holds said first lever means in an inoperative condition in which said claw means are disengaged from strip material in said guiding means when said profile follower means is at said arcs, and holds said first lever means in an operative condition in which said claw means are engageable with strip material in said guiding means when said profile follower means is at said regions of rapidly changing radius.

3. An intermittent drive mechanism as claimed in claim 2, wherein said two arcs are of unequal lengths.

4. An intermittent drive mechanism comprising:
first cam means mounted for rotation about a first axis;
second cam means mounted for rotation about a second axis parallel to and spaced from said first axis;
first lever means arranged to be moved cyclically by rotation of said first cam means;
second lever means arranged to be moved cyclically by rotation of said second cam means;
claw means provided on said first lever means;
strip guiding means adjacent said claw means;
pivoting mean pivotally connecting said first and second lever means and transmitting the cyclical movement of said second lever means to said first lever means whereby said claw mean executes cyclical motion combining the cyclical movements of said first and second lever means; and
profile follower means provided on one of said lever means, one of said cam means comprising a profile having two arcs of equal radius separating two regions of rapidly changing radius, the smaller angle between said regions being substantially 150°, said profile follower means being arranged to follow said profile whereby said one of said lever means holds said claw means in an inoperative condition in which said claw means are disengaged from strip material in said guiding means when said profile follower means is at said arcs, and holds said claw means in an operative condition in which said claw means are engageable with strip material in said guiding means when said profile follower means is at said regions of rapidly changing radius.

5. A mechanism as claimed in claim 4, wherein the smaller angle between said regions is substantially 150°.

6. A mechanism as claimed in claim 5, wherein the first layer means has said claw means at one end thereof and is pivotally connected at the other end thereof to a swingable end of the second lever means, the other end of the second lever means being pivotally mounted to pivot about a pivot axis fixed relative to said first and second axes, the second lever means comprising two levers privotally connected together and one of said levers being resiliently urged by resilient means against the profile of the profile cams.

7. A mechanism as claimed in claim 4, wherein said profile is provided on said first cam means and said second cam means comprises a further profile, said first lever means having said claw means at one end thereof and being mounted at its other end to reciprocatory means adjacent said profile, said profile follower means being provided on said first lever means, said second lever eans having one end thereof pivotally mounted about a fixed pivot relative to said axes, and the other end thereof pivotally coupled to link means to a mid-region of the first lever means, said mid-region being resiliently urged by resilient means to hold said profile follower means against the profile of the first said profile cam, the second lever means being provided with further profile follower means at a mid-region thereof to bear against the profile of the further profile cam.

* * * * *